(12) United States Patent
Lu et al.

(10) Patent No.: US 9,529,466 B2
(45) Date of Patent: Dec. 27, 2016

(54) DISPLAY APPARATUS AND METHOD OF REPAIRING BROKEN LINE THEREOF

(71) Applicants: Shanghai Tianma Micro-Electronics Co., Ltd., Shanghai (CN); Tianma Micro-Electronics Co., Ltd., Shenzhen (CN)

(72) Inventors: Feng Lu, Shanghai (CN); Zhongshou Huang, Shanghai (CN); Hao Chen, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 97 days.

(21) Appl. No.: 14/304,587

(22) Filed: Jun. 13, 2014

(65) Prior Publication Data

US 2015/0185932 A1 Jul. 2, 2015

(30) Foreign Application Priority Data

Dec. 27, 2013 (CN) .......................... 2013 1 0743159

(51) Int. Cl.
*G06F 3/041* (2006.01)
*G06F 11/00* (2006.01)

(52) U.S. Cl.
CPC ............. *G06F 3/0412* (2013.01); *G06F 11/00* (2013.01)

(58) Field of Classification Search
USPC ................................ 345/173; 361/803; 445/2
See application file for complete search history.

(56) References Cited

U.S. PATENT DOCUMENTS

| 6,441,882 B1* | 8/2002 | Yoshioka | G02F 1/1309 349/153 |
| 9,097,921 B2* | 8/2015 | Ogasawara | G02F 1/13452 |
| 2005/0068283 A1* | 3/2005 | Tseng | G02F 1/136259 345/93 |
| 2005/0162581 A1* | 7/2005 | Lim | G02F 1/136259 349/54 |

(Continued)

FOREIGN PATENT DOCUMENTS

CN 101211026 A 7/2008

*Primary Examiner* — Jason Olson
*Assistant Examiner* — Deeprose Subedi
(74) *Attorney, Agent, or Firm* — Alston & Bird LLP

(57) ABSTRACT

A display apparatus is disclosed. First and second conduction terminals are respectively arranged on inner sides of upper and lower substrates. The first and second conduction terminals are electrically connected, and first conduction terminals are respectively electrically connected with first signal traveling lines. In addition, second conduction terminals are respectively electrically connected with second signal traveling lines on the inner side of the lower substrate and pairs of alternative conduction terminals. First and second alternative conduction terminals are respectively arranged on the inner sides of the upper and lower substrates. Furthermore, the first and second alternative conduction terminals are respectively electrically connected through first repair lines, which are arranged on the inner side of the upper substrate. In addition, the first and second alternative conduction terminals are respectively electrically connected with the first repair lines and with alternative wires.

23 Claims, 11 Drawing Sheets

(56) References Cited

U.S. PATENT DOCUMENTS

| | | | |
|---|---|---|---|
| 2005/0195338 A1* | 9/2005 | Matsumoto | G02F 1/136204 349/40 |
| 2009/0033823 A1* | 2/2009 | Chung | G02F 1/136259 349/54 |
| 2009/0284679 A1* | 11/2009 | Kim | G02F 1/1309 349/54 |
| 2010/0171726 A1* | 7/2010 | Chen | G09G 3/3677 345/206 |
| 2011/0146066 A1* | 6/2011 | Kim | G02F 1/1309 29/825 |
| 2012/0081300 A1* | 4/2012 | Chan | G06F 3/044 345/173 |
| 2012/0169986 A1* | 7/2012 | Kwon | G02F 1/13452 349/139 |
| 2015/0102985 A1* | 4/2015 | Kim | G09G 3/3216 345/76 |
| 2015/0179678 A1* | 6/2015 | Xu | H01L 27/1244 345/93 |

* cited by examiner

DISPLAY APPARATUS AND METHOD OF REPAIRING BROKEN LINE THEREOF

CROSS REFERENCE TO RELATED APPLICATIONS

This application claims the benefit of priority to Chinese Patent Application No. 201310743159.8, filed with the Chinese Patent Office on Dec. 27, 2013, and entitled "Display apparatus and method of repairing broken line thereof", the content of which is incorporated herein by reference in its entirety.

TECHNICAL FIELD

The present invention relates to the field of display technologies and particularly to a display apparatus and a method of repairing a broken line thereof.

BACKGROUND OF THE INVENTION

In the prior art, a primary touch-control sense structure of an in-cell touch display screen is located on the Color Film (CF) substrate side, and a signal input and a signal output are both implemented by the Thin Film Transistor (TFT) substrate side and a Flexible Printed Circuit (FPC) adhered therewith. Conduction terminals (pads, also referred to conductive pads) arranged respectively at corresponding locations on the CF substrate side and the TFT substrate side are bonded by a frame adhesive mixed with gold balls, where the gold balls are configured to enable two conduction terminals located respectively at the CF substrate side and the TFT substrate side to be electrically connected with each other, so that an in-cell touch structure at the CF substrate side can be electrically connected with the TFT substrate side through the conduction terminals and the gold balls in the frame adhesive.

At present, in-cell touch display screens produced by various screen manufacturers generally may suffer from the problem of defective products, the majority of which may occur as a result of Touch Plane (TP) broken lines arising because the conduction terminals at the CF substrate side and the TFT substrate side are poorly connected. There may be numerous factors resulting in poor conductions between the conduction terminals in practical production, for example, a too small size of a gold ball, a too low density at which the gold balls are distributed, a poor condition under which the frame adhesive is applied, a remaining color-resist of the frame adhesive, etc.; and moreover there is a bridge structure of a longitudinally traveling line in a touch plane viewable area, so the phenomenon of a poor conduction may also occur at the bridge. Consequently there may be some probability of a TP broken line occurring in the in-cell touch display apparatus. For the in-cell touch display apparatus, the entire in-cell touch display apparatus has to be rejected even if a single TP traveling line therein is broken.

BRIEF SUMMARY OF THE INVENTION

One inventive aspect is a display apparatus. The display apparatus includes an upper substrate, a lower substrate opposing the upper substrate, and a plurality of pairs of conduction terminals, where a first conduction terminal in each of the pairs is arranged on an inner side of the upper substrate, and a second conduction terminal of the pair of conduction terminals is correspondingly arranged on an inner side of the lower substrate. The first conduction terminal and the second conduction terminal are electrically connected through a conductive adhesive, and a plurality of first conduction terminals are respectively electrically connected with a plurality of first signal traveling lines on the inner side of the upper substrate. In addition, a plurality of second conduction terminals are respectively electrically connected with a plurality of second signal traveling lines on the inner side of the lower substrate, and a plurality of pairs of alternative conduction terminals, where a first alternative conduction terminal in each of the pairs of alternative conduction terminals is arranged on the inner side of the upper substrate. Furthermore, a second alternative conduction terminal in each of the pairs of alternative conduction terminal is arranged correspondingly on the inner side of the lower substrate, and the first alternative conduction terminals and the second alternative conduction terminals are respectively electrically connected through a conductive adhesive and a plurality of first repair lines. Additionally, the first repair lines are arranged on the inner side of the upper substrate, and the first alternative conduction terminals are respectively electrically connected with the first repair lines, and respective second alternative conduction terminals are respectively electrically connected with alternative wires.

Another inventive aspect is a method of repairing a broken line in a display apparatus, such as that described above. The method includes determining that there is at least one of a conduction failure between a first conduction terminal in the pair of conduction terminals and a first signal traveling line, a conduction failure between a second conduction terminal in the pair of conduction terminals and a second signal traveling line, and a conduction failure between the first conduction terminal and the second conduction terminal in the pair of conduction terminals, and in response to the determining, electrically connecting the first signal traveling line with a first repair line.

DETAILED DESCRIPTION OF THE PREFERRED EMBODIMENTS

Figure 1A:
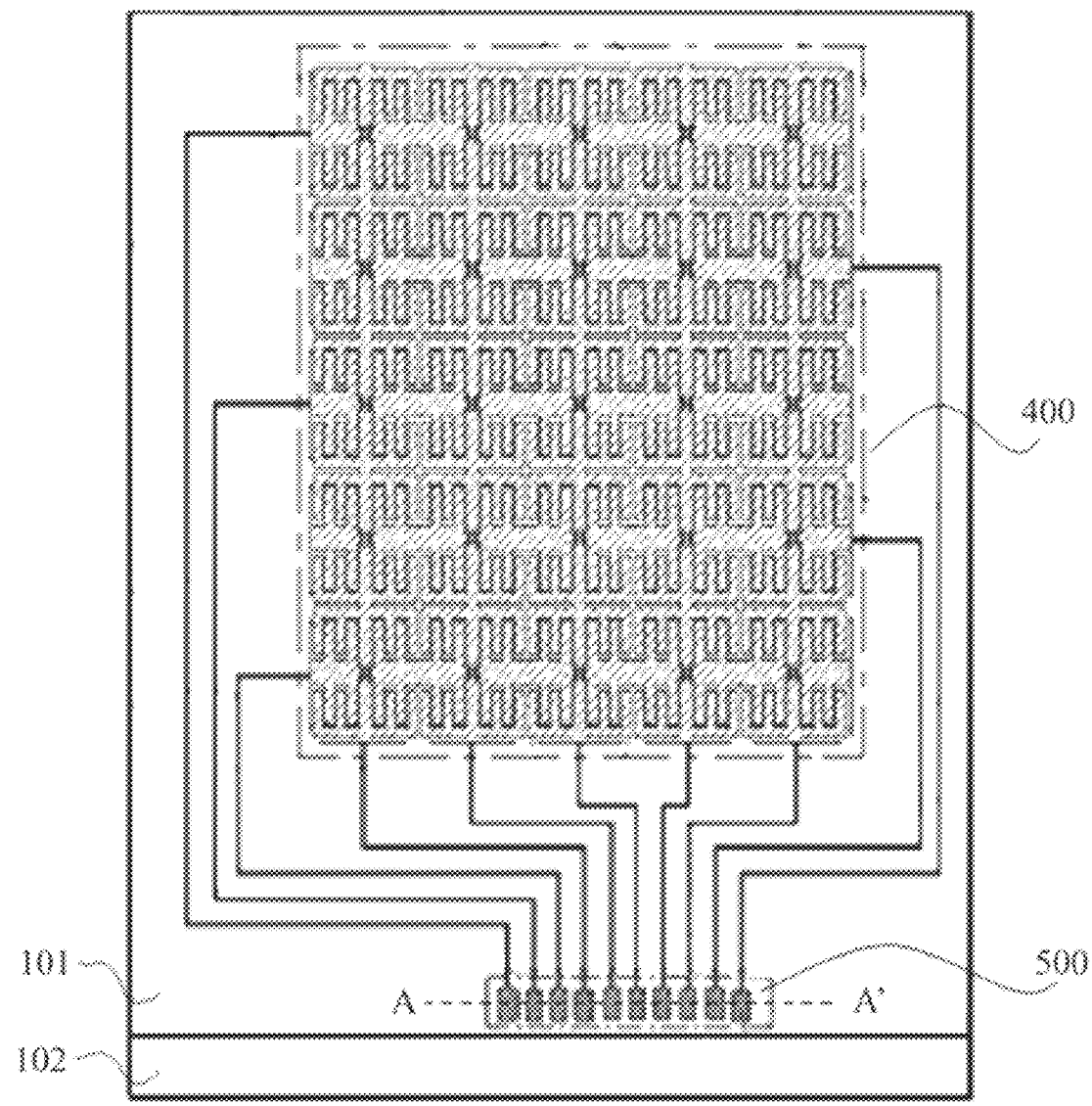
FIG. 1(a) is a schematic diagram of a display apparatus according to an embodiment of the invention.

Embodiments of the invention will be described below with reference to the drawings, and it shall be appreciated that the embodiments described here are merely intended to describe and explain the invention but not to limit the invention. The embodiments of the invention and features in the embodiments can be combined with each other unless there is a confliction.

It shall be noted that a display apparatus with an in-cell touch screen will be described as an example in the following embodiments of the invention, but the invention will not be limited thereto, and any other display apparatus capable of embodying this structure and being repaired with this structure will also be encompassed by the invention.

In an embodiment of the invention, in order to address the problem of a poor conduction arising as a result of a conduction failure between conduction terminals in the in-cell touch screen, a plurality of alternative conduction terminals can be arranged in the display apparatus, first repair lines can be arranged separately on an upper substrate of the display apparatus, and there are respective first repair areas at the intersections of the respective first repair lines with first signal traveling lines, and when there is a conduction failure, the structure of a first repair area is determined, and then a first repair line is electrically connected with a first signal traveling line selectively through across-layer fusing or intra-layer fusing, thereby achieving a repair effect.

Optionally second repair lines can be further arranged on a lower substrate of the display apparatus while the first repair lines are arranged on the upper substrate, or third repair lines can be further arranged in a touch structure of the upper substrate while the first repair lines and the second repair lines are arranged respectively on the upper and lower substrates, and when there is a failing conduction terminal or a broken drive line (or sense line), an appropriate repair area can be selected, and a first repair line and a second repair line respectively can be electrically connected with a corresponding signal traveling line selectively through across-layer fusing or intra-layer fusing dependent upon the structure of the repair area, or a third repair line can be electrically connected across both ends of a drive line (or a sense line) at the location where the line is broken.

The solution according to the invention will be described below in details with reference to embodiments thereof, but the invention will not be limited to the following embodiments.

It shall be noted that three display apparatus structured differently according to embodiments of the invention will be described below based upon a display apparatus illustrated in FIG. 1(a) which is a schematic diagram of a display apparatus according to an embodiment of the invention, where the display apparatus includes an upper substrate 101 and a lower substrate 102 arranged in opposition with the area of the lower substrate 102 being slightly larger than the area of the upper substrate 101, there is a touch display area 400 arranged in the display apparatus, touch-control lines are arranged on the inner side of the upper substrate 101, a number of traveling lines are extended from the touch-control lines, and the traveling lines are connected with a conduction terminal area 500 on the inner side of the upper substrate 101.

Figure 1B:
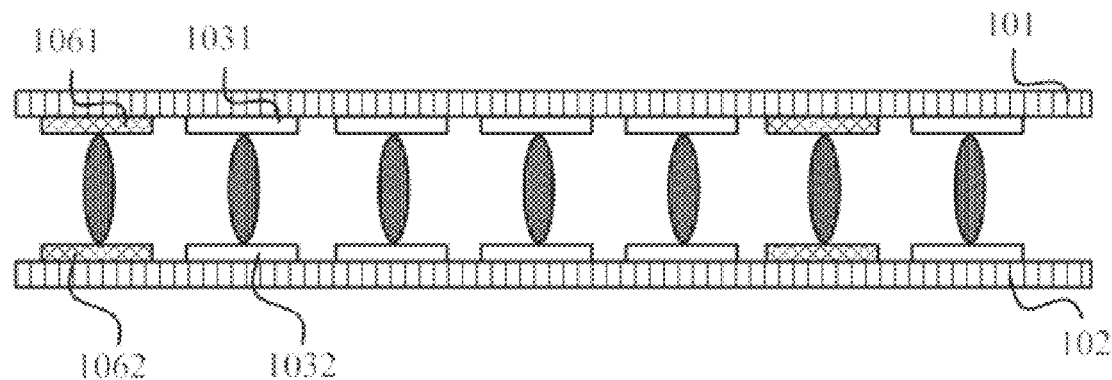
FIG. 1(b) is a sectional view of the display apparatus according to an embodiment of the invention along the AA' line in FIG. 1(a)

Moreover as illustrated in FIG. 1(b), a sectional view of the display apparatus according to an embodiment of the invention along the AA' line in FIG. 1(a) is shown. As can be seen from FIG. 1(b), conduction terminals between the upper and lower substrates are electrically connected through gold balls.

In a display apparatus according to an embodiment, only first repair lines are arranged on the upper substrate to connect first alternative conduction terminals; in a display apparatus according to an embodiment, second repair lines are further arranged on the lower substrate to connect second alternative conduction terminals based upon the forgoing scheme in which the repair lines are arranged on the upper substrate; and moreover in a display apparatus according to an embodiment, loop-shaped third repair lines are further arranged on the inner side of the upper substrate based upon the scheme in which the repair lines are arranged on both the upper and lower substrates.

Figure 1C:
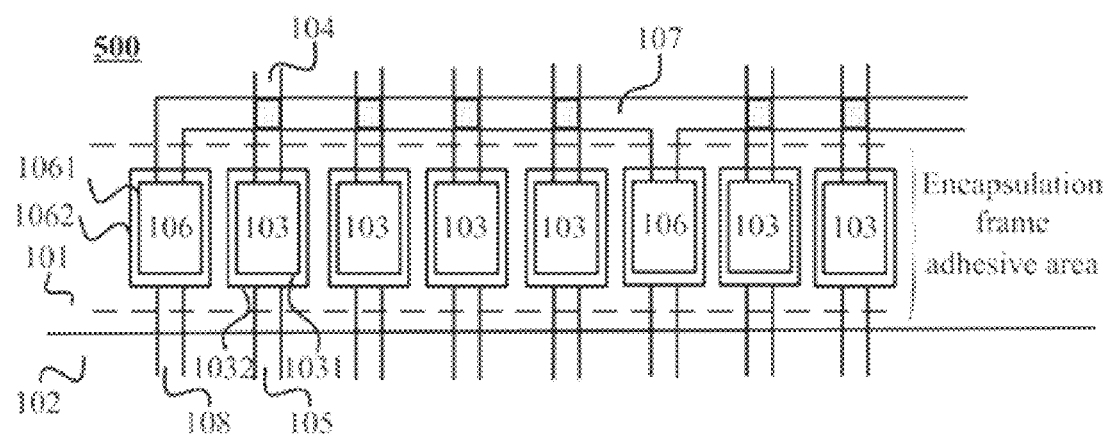
FIG. 1(c) is a diagram of a repair structure according to an embodiment of the invention.

An embodiment of the invention will be described below in details with reference to FIG. 1(c). As illustrated in FIG. 1(c), there is illustrated a display apparatus according to the embodiment of the invention, which includes an upper substrate 101 and a lower substrate 102 arranged in opposition and further includes the following structural elements.

The structural elements may include a plurality of pairs of conduction terminals 103 according to an embodiment, where a first conduction terminal 1031 in each pair of conduction terminals is arranged on the inner side of an upper substrate, and a second conduction terminal 1032 of the pair of conduction terminals 103 is arranged correspondingly on the inner side of a lower substrate; and the first conduction terminal 1031 and the second conduction terminal 1032 are electrically connected through a conductive adhesive, where the plurality of first conduction terminals 1031 are electrically connected respectively with a plurality of first signal traveling lines 104 on the inner side of the upper substrate 101, and the plurality of second conduction terminals 1032 are electrically connected respectively with a plurality of second signal traveling lines 105 on the inner side of the lower substrate 102.

Optionally in an embodiment of the invention, when the first conduction terminals 1031 are arranged at a different layer from the corresponding first signal traveling lines 104, the first conduction terminals 1031 can be electrically connected with the corresponding first signal traveling lines 104 through via holes above the first conduction terminals 1031, and it shall be noted that the invention will not be limited to any particular connection scheme so long as the first conduction terminals 1031 can be electrically connected with the first signal traveling lines 104, for example, when the first conduction terminals 1031 are arranged at the same layer with the corresponding first signal traveling lines 104, the first conduction terminals 1031 can be electrically connected directly with the corresponding first signal traveling lines 104. Similarly, the second conduction terminals 1032 and the corresponding second signal traveling lines 105 can be electrically connected through via holes when they overlap across layers or can be electrically connected directly when they are arranged at the same layer.

The structural elements may include at least one pair of alternative conduction terminals 106 according to an embodiment, where a first alternative conduction terminal 1061 in each pair of alternative conduction terminals 106 is arranged on the inner side of the upper substrate 101, and a second alternative conduction terminal 1062 of the pair of alternative conduction terminal 106 is arranged correspondingly on the inner side of the lower substrate 102; and the first alternative conduction terminal 1061 and the second alternative conduction terminal 1062 are electrically connected through a conductive adhesive.

The structural elements may include first repair lines 107 according to an embodiment, where the first repair lines 107 are arranged on the inner side of the upper substrate 101, the respective first alternative conduction terminals 1061 are electrically connected respectively with the first repair lines 107, and the respective second alternative conduction terminals 1062 are electrically connected respectively with alternative wires 108.

Where the area of the upper substrate 101 is smaller than the area of the lower substrate 102, and FIG. 1(*a*) illustrates a sectional view of a part thereof which shows the boundary of the upper substrate 101 but does not show the entire area of the boundary of the lower substrate 102, and there will be a stepped area near the boundary of the upper substrate 101 in the top view of the display device as illustrated in FIG. 1(*a*).

Optionally in an embodiment of the invention, when the first alternative conduction terminals 1061 are arranged at a different layer from the corresponding first repair lines 107, the first alternative conduction terminals 1061 can be electrically connected with the corresponding first repair lines 107 through via holes above the first alternative conduction terminals 1061, and it shall be noted that the invention will not be limited to any particular connection scheme so long as the first alternative conduction terminals 1061 can be electrically connected with the first repair lines 107, for example, when the first alternative conduction terminals 1061 are arranged at the same layer with the corresponding first repair lines 107, the first alternative conduction terminals 1061 can be electrically connected directly with the first repair lines 107. Similarly, the second alternative conduction terminals 1062 and the corresponding alternative wires 108 can be connected through via holes when they overlap at different layers or can be electrically connected directly when they are arranged at the same layer.

Optionally the alternative wires 108 are arranged on the lower substrate and connected with an external circuit, and in an embodiment of the invention, the alternative wires can be understood as traveling lines connected with the second alternative conduction terminals and are functionally similar to the second signal traveling lines connected with the second conduction terminals so that when an alternative conduction terminal corresponding to an alternative wire is in use, a second signal traveling line connected with a second conduction terminal with a conduction failure can be replaced by the alternative wire for connection with the external circuit.

During detection of the display apparatus, if there is a detected conduction failure of a first conduction terminal in a pair of conduction terminals with a first signal traveling line or conduction failure of a second conduction terminal in the pair of conduction terminals with a second signal traveling line or conduction failure of the first conduction terminal with the second conduction terminal, then the first signal traveling line connected with the first conduction terminal in the display apparatus is electrically connected with a first repair line arranged on the upper substrate.

In an embodiment of the invention, an intersection of a first signal traveling line with a first repair line and a neighborhood of the intersection can be defined as a first repair area. The first signal traveling line can be electrically connected with the first repair line after repairing due to an arrangement scheme of the first signal traveling line and the first repair line (that is, a structure of the first repair area). Three embodiments for different arrangement schemes are proposed and will be described below in details with reference to structural elements in FIG. 1(*c*).

An embodiment of the invention will be described below in details with reference to FIG. 2(*a*). As illustrated in FIG. 2(*a*), there is illustrated a stricture of a first repair area according to the embodiment of the invention.

In this embodiment, the first signal traveling line 104 and the first repair line 107 are arranged simply, and since the first repair line 107 is an integral wire in the upper substrate, the first repair line 107 is arranged at a different layer from and overlaps in insulation with the first signal traveling line 104 connected with the first conduction terminal.

Generally the first repair line overlaps at a different layer with the first signal traveling line in an area filled with an insulation layer which is typically an organic film layer, e.g., a transparent organic film, a color-resist, etc. Both the first repair line and the first signal traveling line can be made of metal or a transparent conductive material.

An embodiment of the invention will be described below in details with reference to FIG. 2(*b*). As illustrated in FIG. 2(*b*), there is illustrated a structure of a first repair area according to the embodiment of the invention.

In this embodiment, the first repair line 107 which is structurally complex includes a first repair line first part 1071 and a first repair line second part 1072, and the first repair line second part 1072 is arranged at a different layer from and overlaps in insulation with the first signal traveling line 104; the first repair line first part 1071 is arranged between adjacent first signal traveling lines 104, the first repair line first part 1071 is arranged at the same layer as the first signal traveling line 104, and the first repair line first part 1071 is electrically connected with the first repair line second part 1072; and a first repair section 1073 is arranged at an end of the first repair line first part 1071 proximate to the first signal traveling line 104, where there is a gap arranged between the first repair section 1073 and the first signal traveling line 104.

Optionally the first repair line first part 1071 and the first repair line second part 1072 can be electrically connected through an insulation layer via hole.

An embodiment of the invention will be described below in details with reference to FIG. 2(*c*). As illustrated in FIG. 2(*c*), there is illustrated a structure of a first repair area according to the embodiment of the invention.

In this embodiment, the first repair line 107 includes a first repair line first part 1071 and a first repair line second part 1072, and the first repair line second part 1072 is arranged at a different layer from and overlaps in insulation with the first signal traveling line 104; and the first repair line first part 1071 is arranged between adjacent first signal traveling lines 104 and is arranged at a different layer from the first signal traveling lines 104, and the first repair line first part 1071 is electrically connected with the first repair line second part 1072.

Optionally the first repair line first part 1071 and the first repair line second part 1072 can be electrically connected through an insulation layer via hole.

It shall be noted that in this embodiment, the first repair line first part 1071, the first repair line second part 1072 and the first signal traveling line 104 are all arranged at different layers from each other, and given the locations of the first signal traveling line 104 and the first repair line second part 1072, the first repair line first part 1071 can be arranged below the first repair line second part 1072, and the first repair line first part 1071 can be arranged at a different layer from the first signal traveling line 104 by adjusting the depth of the insulation layer via hole (the thickness of an insulation layer), as illustrated in FIG. 2(*c*); and moreover, other than the structure illustrated in FIG. 2(*c*), the first repair line first part can also be arranged above the first repair line second part and electrically connected with the first repair line second part through the insulation layer via hole.

Optionally the areas where the first alternative conduction terminals contact with the conductive adhesive are larger than the areas where the first conduction terminals contact with the conductive adhesive, and the areas where the second alternative conduction terminals contact with the conductive adhesive are larger than the areas where the second conduction terminals contact with the conductive adhesive.

In an embodiment of the invention, the first repair lines connected with the first alternative conduction terminals can be arranged on the upper substrate of the display apparatus, and a different first repair area structure can be arranged flexibly dependent upon a different first repair line structure. Thus an appropriate repair scheme can be selected dependent upon the different first repair area structure when there is a conduction failure.

Based upon the structure of the display apparatus according to the embodiments described above, an embodiment of the invention further provides another display apparatus, which will be described below in details.

Figure 3:
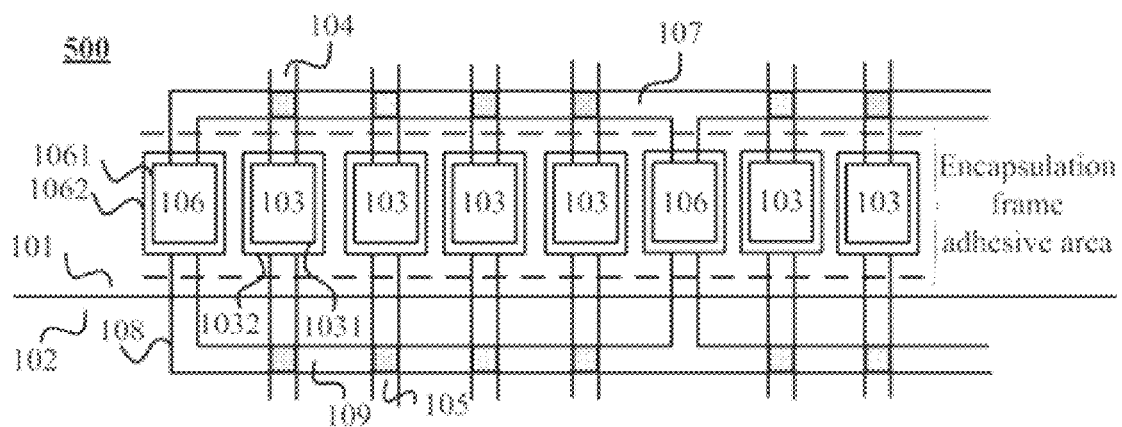
FIG. 3 is a diagram of a repair structure according to an embodiment of the invention.

This embodiment of the invention will be described below in details with reference to FIG. 3. As illustrated in FIG. 3, there is illustrated a diagram of another repair structure according to the embodiment of the invention, and a display apparatus including the repair structure further includes all the structural elements 101 to 108 of the display apparatus as illustrated in FIG. 1(*c*) and further includes the following structural elements.

The display apparatus may further include second repair lines 109, which are arranged on the inner side of the lower substrate 102 and electrically connected with the alternative wires 108. Since the alternative wires are electrically connected with the second repair lines, the respective alternative wires and second repair lines can be replaced by single wires. Moreover the alternative wires 108 previously were signal traveling lines of the second alternative conduction terminals, and after they are electrically connected with the second repair lines, this means that the signal traveling lines connected with the second alternative conduction terminals will have no separate pins extended from the signal traveling lines.

In this embodiment of the invention, similarly to the upper substrate, an intersection of a second signal traveling line with a second repair line and a neighborhood thereof can be defined as a second repair area. The second signal traveling line can be electrically connected with the second repair line after repairing also due to an arrangement scheme of the second signal traveling line and the second repair line (that is, a structure of the second repair area). Thus there are three structures for the second repair area of the lower substrate in this embodiment similar to the first repair area of the upper substrate, which will be described below in details with reference to structural elements in FIG. 3.

Figure 4A:
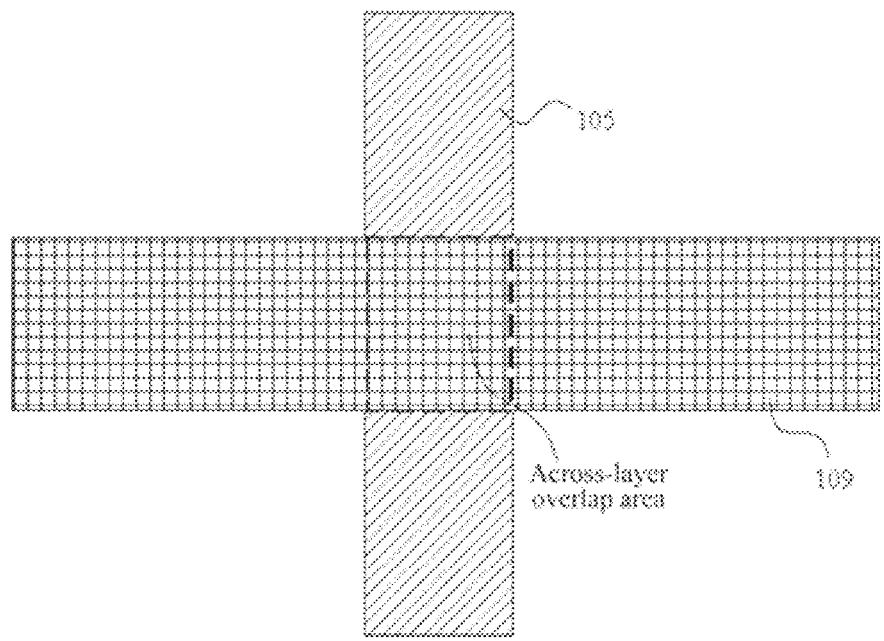
FIG. 4(a) illustrates a structure of a second repair area according to an embodiment of the invention.
Figure 4B:
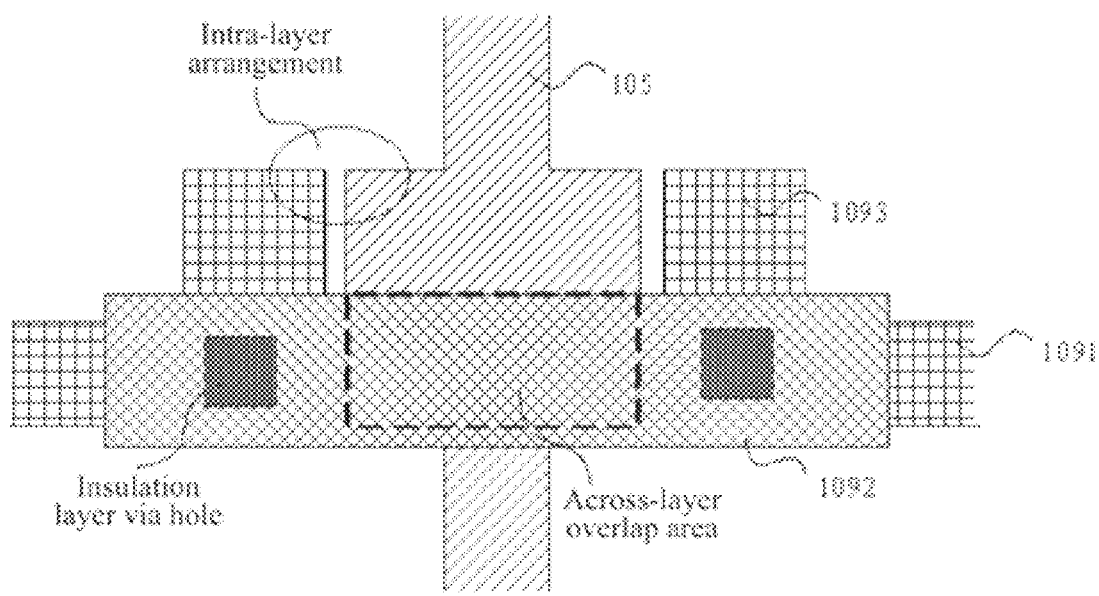
FIG. 4(b) illustrates a structure of a second repair area according to an embodiment of the invention.
Figure 4C:
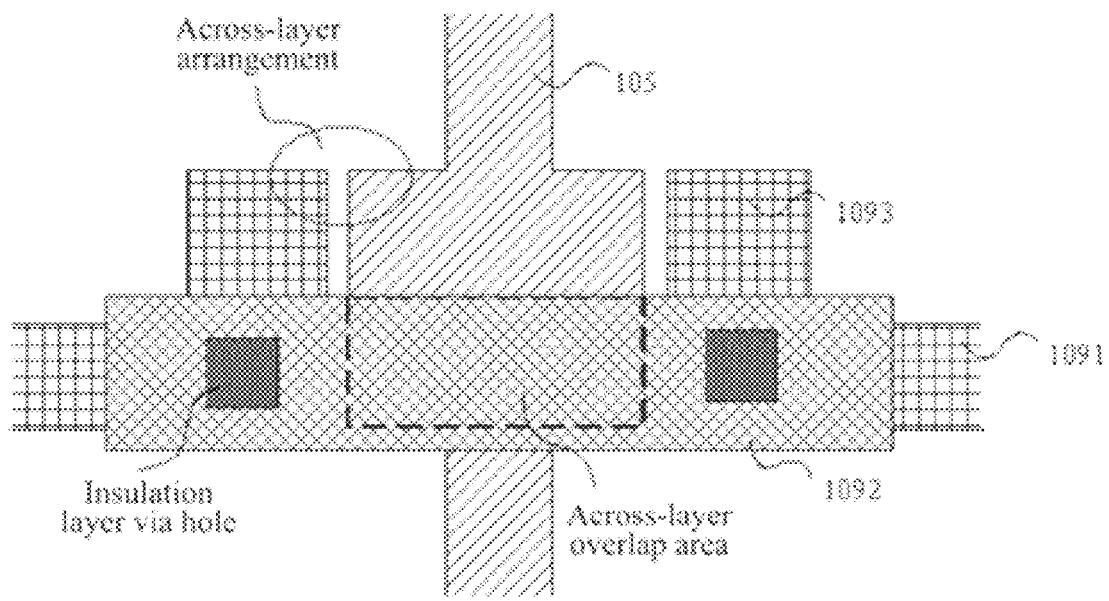
FIG. 4(c) illustrates a structure of a second repair area according to an embodiment of the invention.

An embodiment of the invention will be described below in details with reference to FIG. 4(*a*). As illustrated in FIG. 4(*a*), there is illustrated a stricture of a second repair area according to the embodiment of the invention.

In this embodiment, the second signal traveling line 105 and the second repair line 109 are arranged simply, and since the second repair line 109 is an integral wire in the lower substrate, the second repair line 109 is arranged at a different layer from and overlaps in insulation with the second signal traveling line 105 connected with the second conduction terminal Generally the second repair line 109 overlaps at a different layer with the second signal traveling line 105 in an area filled with an insulation layer which is typically silicon oxide, e.g., silicon nitride, silicon oxide, etc. Both the second repair line 109 and the second signal traveling line 105 are typically made of gate metal or source or drain metal.

An embodiment of the invention will be described below in details with reference to FIG. 4(*b*). As illustrated in FIG. 4(*b*), there is illustrated a structure of a second repair area according to the embodiment of the invention.

In this embodiment, the second repair line 109 which is structurally complex includes a second repair line first part 1091 and a second repair line second part 1092, and the second repair line second part 1092 is arranged at a different layer from and overlaps in insulation with the second signal traveling line 105; the second repair line first part 1091 is arranged between adjacent second signal traveling lines 105, the second repair line first part 1091 is arranged at the same layer as the second signal traveling line 105, and the second repair line first part 1091 is electrically connected with the second repair line second part 1092; and a second repair section 1093 is arranged at an end of the second repair line first part 1091 proximate to the second signal traveling line 105, where there is a gap arranged between the second repair section 1093 and the second signal traveling line 105.

Optionally the second repair line first part 1091 and the second repair line second part 1092 can be electrically connected through an insulation layer via hole.

An embodiment of the invention will be described below in details with reference to FIG. 4(*c*). As illustrated in FIG. 4(*c*), there is illustrated a structure of a second repair area according to the embodiment of the invention.

In this embodiment, the second repair line includes a second repair line first part 1091 and a second repair line second part 1092, and the second repair line second part 1092 is arranged at a different layer from and overlaps in insulation with the second signal traveling line 105; and the second repair line first part 1091 is arranged between adjacent second signal traveling lines 105 and is arranged at a different layer from the second signal traveling lines 105, and the second repair line first part 1091 is electrically connected with the second repair line second part 1092.

Optionally the second repair line first part 1091 and the second repair line second part 1092 can be electrically connected through an insulation layer via hole.

It shall be noted that in this embodiment, the second repair line first part 1091, the second repair line second part 1092 and the second signal traveling line 105 are all arranged at different layers from each other, and given the locations of the second signal traveling line 105 and the second repair line second part 1092, the second repair line first part 1091 can be arranged below the second repair line second part 1092, and the second repair line first part 1091 can be arranged at a different layer from the second signal traveling line 105 by adjusting the depth of the insulation layer via hole (the thickness of an insulation layer), as illustrated in FIG. 4(*c*); and moreover, other than the structure illustrated in FIG. 4(*c*), the second repair line first part can also be arranged above the second repair line second part and electrically connected with the second repair line second part through the insulation layer via hole.

In an embodiment of the invention, the first repair lines connected with the first alternative conduction terminals can be arranged on the upper substrate of the display apparatus while the second repair lines connected with the second alternative conduction terminals can be arranged on the lower substrate, and a different first repair area structure and second repair area structure can be arranged flexibly dependent upon a different first repair line and second repair line. Moreover, the alternative wires connected with the second alternative conduction terminals of the lower substrate in the embodiment will not have separate pins extended therefrom but be electrically connected directly with the second repair lines. Thus an appropriate repair scheme can be selected dependent upon the first repair area structure and the second repair area structure arranged in practice, and repair operations can be performed on both the upper substrate and the lower substrate when there is a conduction failure.

However the defect of a broken line in the in-cell touch screen may occur not only between the conduction terminals of the upper substrate and the lower substrate but also in a touch display area of the upper substrate. A structure of a display apparatus arranged for repairing in a touch display area will be described below in details with reference to an embodiment of the invention.

Figure 5:
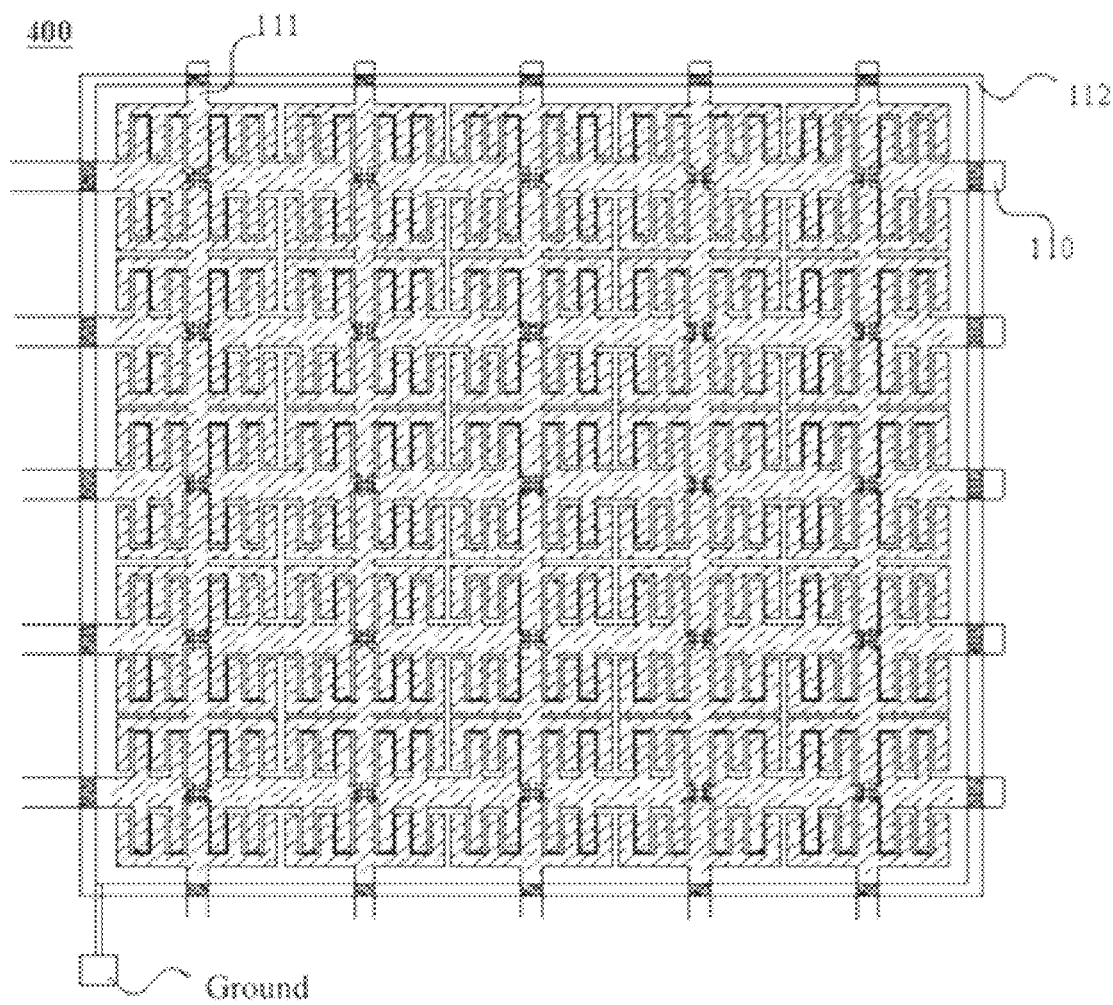
FIG. 5 illustrates a display apparatus according to an embodiment of the invention.

This embodiment of the invention will be described below in details with reference to FIG. 5. The embodiment of the invention provides a display apparatus including all the structural elements 101 to 109 of the display apparatus as illustrated in FIG. 3, and moreover as illustrated in FIG. 5, the display apparatus further includes the following structural elements.

A plurality of drive lines 110 are included in the display apparatus, where each drive line 110 is arranged transversely on the inner side of the upper substrate and electrically connected with a first signal traveling line.

A plurality of sense lines 111 are included in the display apparatus, where each sense line 111 is arranged longitudinally on the inner side of the upper substrate and electrically connected with a first signal traveling line.

Figure 6:
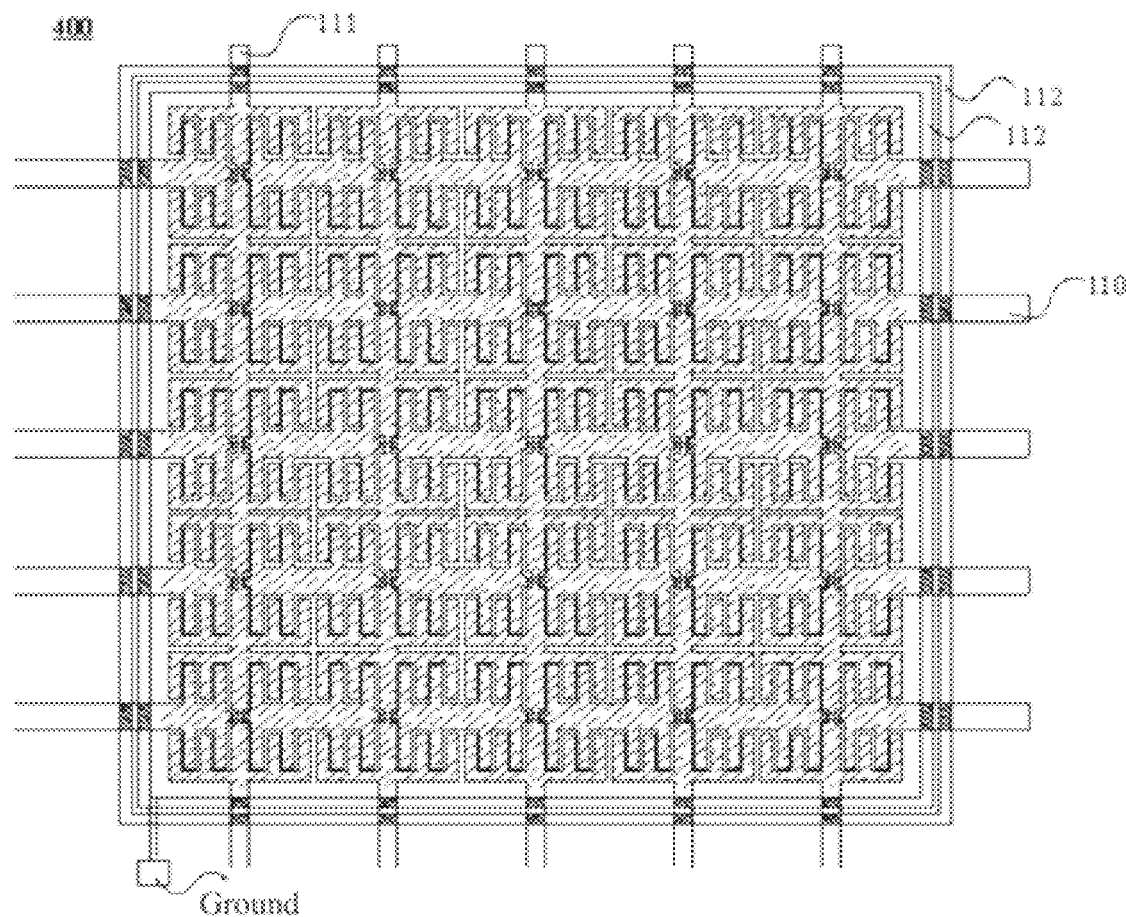
FIG. 6 illustrates a display apparatus with multiple nested turns of third repair lines according to an embodiment of the invention.

One or more than one third pair line 112 is included in the display apparatus. The third pair line 112 is arranged on the inner side of the upper substrate as a looped line, and overlaps in insulation with each drive line in two areas and overlaps in insulation with each sense line in two areas, and the drive line intersects with the sense line at a bridge structure, where the line width of the third pair line 112 needs to be determined by the size of a design space in practice, but the line width must ensure the resistance of the third repair line not to be too higher. When there are a plurality of third pair lines, they can be arranged nested in multiple turns as illustrated in FIG. 6 for the purpose of achieving a plurality of broken lines.

In the embodiment of the invention, an intersection of a drive line (or a sense line) with a third repair line and a neighborhood thereof can be defined as a third repair area. Similarly to the forgoing embodiments described above, the third repair area can also be arranged in three different structures but will be described only taking the structure illustrated in FIG. 5 as an example in the embodiment of the invention in view of the requirement and the difficulty of a process.

It shall be noted that all the shapes of the first repair area, the second repair area and the third repair area can be determined empirically, and their sizes need to be decided by the capacity and the repair efficiency of a repairing machine.

In the embodiment of the invention described above, the first repair lines and the third repair lines can be arranged on the inner side of the upper substrate of the display apparatus while the second repair lines are arranged on the inner side of the lower substrate. Thus the problem of a broken line between a drive line and a sense line on the inner side of the upper substrate can be addressed while the problem of a poor conduction of conduction terminals of the upper and lower substrate is addressed. Actually in a process of preparing the display apparatus, there may be only the third repair lines arranged on the inner side of the upper substrate, or there may be only the first repair lines and the third repair lines arranged on the inner side of the upper substrate, as desired in practice.

Three schemes to arrange the repair lines have been described in the foregoing embodiments, where a larger number of repair lines can better address the problem of a poor conduction, but the capacity to perform a production process shall also be taken into account. Particularly the line widths of the first repair lines, the second repair lines and the third repair lines are determined by the capacity of a repairing machine, the repair efficiency of the repairing machine and a requirement on the resistances of the signal traveling lines.

In summary, any of the foregoing embodiments can address the problem of a poor conduction by arranging the repair lines to thereby improve the yield rate of products.

Based upon a display apparatus according to an embodiment of the invention, a method of repairing a broken line in the display apparatus is provided according to an embodiment of the invention.

Figure 7:
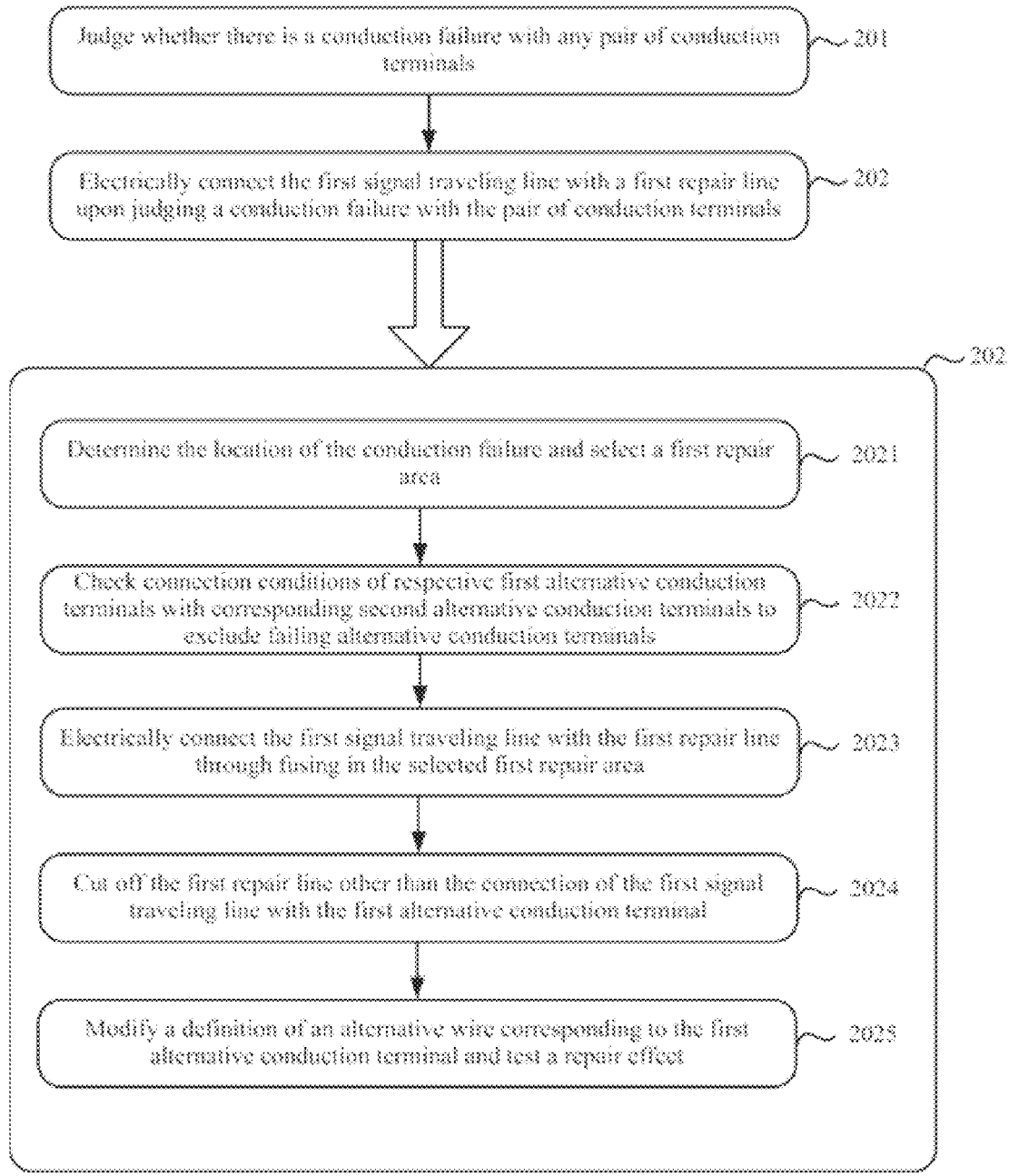
FIG. 7 is a flow chart of a method of repairing a broken line in a display apparatus according to an embodiment of the invention.

The embodiment of the invention will be described below in details with reference to FIG. 7. As illustrated in FIG. 7, there is illustrated a flow chart of a method of repairing a broken line in the display apparatus according to the embodiment of the invention, and the method generally includes the following steps 201 and 202.

The step 201 is to judge whether there is a conduction failure with any pair of conduction terminals.

The following several conduction failures may be possible in this step 201: a). a conduction failure between a first conduction terminal and a first signal traveling line; b). a conduction failure between a second conduction terminal and a second signal traveling line; and c). a conduction failure between the first conduction terminal and the second conduction terminal.

The step 202 is to electrically connect the first signal traveling line with a first repair line upon judging a conduction failure with the pair of conduction terminals.

This step 202 may further include the following sub-steps 2021 to 2025.

The sub-step 2021 is to determine the location of the conduction failure and to select a first repair area.

In addition to this, in this sub-step 2021, a line traveling scheme of the signal traveling line after repairing is designed after the location of the conduction failure is determined and before the first repair area is selected.

The sub-step 2022 is to check connection conditions of respective first alternative conduction terminals with corresponding second alternative conduction terminals to exclude failing alternative conduction terminals.

It shall be noted that all the alternative conduction terminals exist in pairs, so a pair of alternative conduction terminals will be excluded as long as one of the alternative conduction terminals fails or there is a poor conduction between the first alternative conduction terminal and the second alternative conduction terminal.

The step 2023 is to electrically connect the first signal traveling line with the first repair line through fusing in the selected first repair area.

In a particular process of connecting through fusing, an appropriate fusing scheme can be selected dependent upon the structure of the first repair area arranged for the display apparatus. Generally across-layer fusing and across-layer fusing can be possible.

Figure 2A:
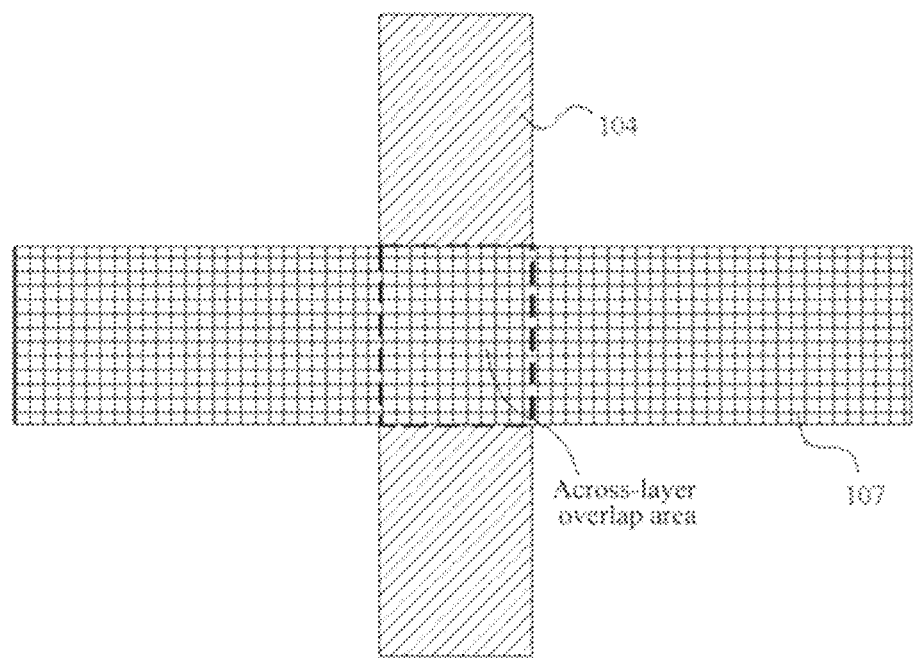
FIG. 2(a) illustrates a structure of a first repair area according to an embodiment of the invention.

For the structure of the first repair area illustrated in FIG. 2(a), since the first repair line is arranged at a different layer from and overlaps in insulation with the first signal traveling line, the first signal traveling line and the first repair line can be electrically connected through across-layer fusing. Specifically in the area where the first repair line overlaps at a different layer with the first signal traveling line, the first repair line or the first signal traveling line in the across-layer overlap area is irradiated by laser to fuse and break through the insulation layer in the area so that the first repair line is electrically connected with the first signal traveling line.

Figure 2B:
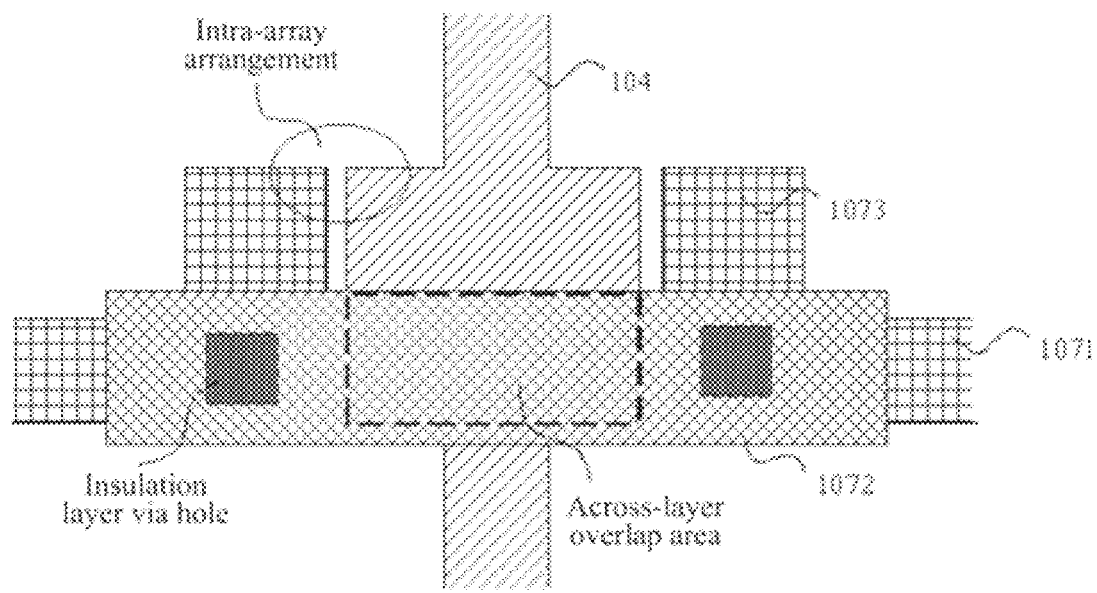
FIG. 2(b) illustrates a structure of a first repair area according to an embodiment of the invention.

For the structure of the first repair area illustrated in FIG. 2(b), since the first repair line second part is arranged at a different layer from and overlaps in insulation with the first signal traveling line, the first signal traveling line and the first repair line second part can also be electrically connected through across-layer fusing (a fusing operation similar to that for the structure illustrated in FIG. 2(a)).

Further, in the structure of the first repair area, the first repair line first part is arranged at the same layer as the first signal traveling line, the first repair line first part is electrically connected with the first repair line second part, and the first repair section is arranged at an end of the first repair line first part proximate to the first signal traveling line, so the first signal traveling line and the first repair line first part can be electrically connected through intra-layer fusing, and specifically the first repair section of the first repair line first part is irradiated by laser to fuse the first repair section or to fuse the first signal traveling line adjacent to the first repair section so that the first signal traveling line is electrically connected with the first repair line first part.

Optionally for the structure illustrated in FIG. 2(b), generally firstly across-layer fusing is performed for repairing, and intra-layer fusing can be performed for repairing when repairing through across-layer fusing fails.

Figure 2C:
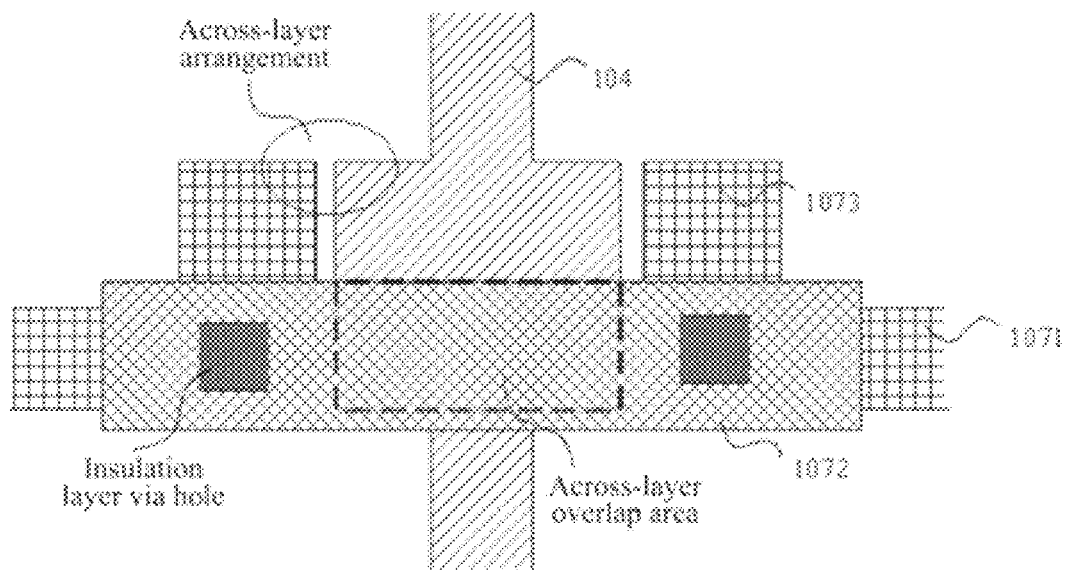
FIG. 2(c) illustrates a structure of a first repair area according to an embodiment of the invention.

For the structure of the first repair area illustrated in FIG. 2(c), since the first repair line second part is arranged at a different layer from the first signal traveling line and overlaps in insulation with the first signal traveling line, and the first repair line first part is arranged at a different layer from the first signal traveling line, the first signal traveling line and the first repair line first part can be electrically connected through across-layer fusing (a fusing operation similar to that for the structure illustrated in FIG. 2(a)).

With the foregoing connecting through fusing, the first signal traveling line is electrically connected with the first alternative conduction terminal through the first repair line.

It shall be noted that the invention will not be limited to fusing in the laser fusing scheme but can also be applicable with other fusing schemes in the prior art, and the invention will not be limited in this respect.

The sub-step 2024 is to cut off the first repair line other than the connection of the first signal traveling line with the first alternative conduction terminal.

The sub-step 2025 is to modify a definition of an alternative wire corresponding to the first alternative conduction terminal and to test a repair effect.

The definition of the alternative wire corresponding to the first alternative conduction terminal is modified to a definition of a second signal traveling line corresponding to the conduction terminal with the conduction failure.

Figure 8:
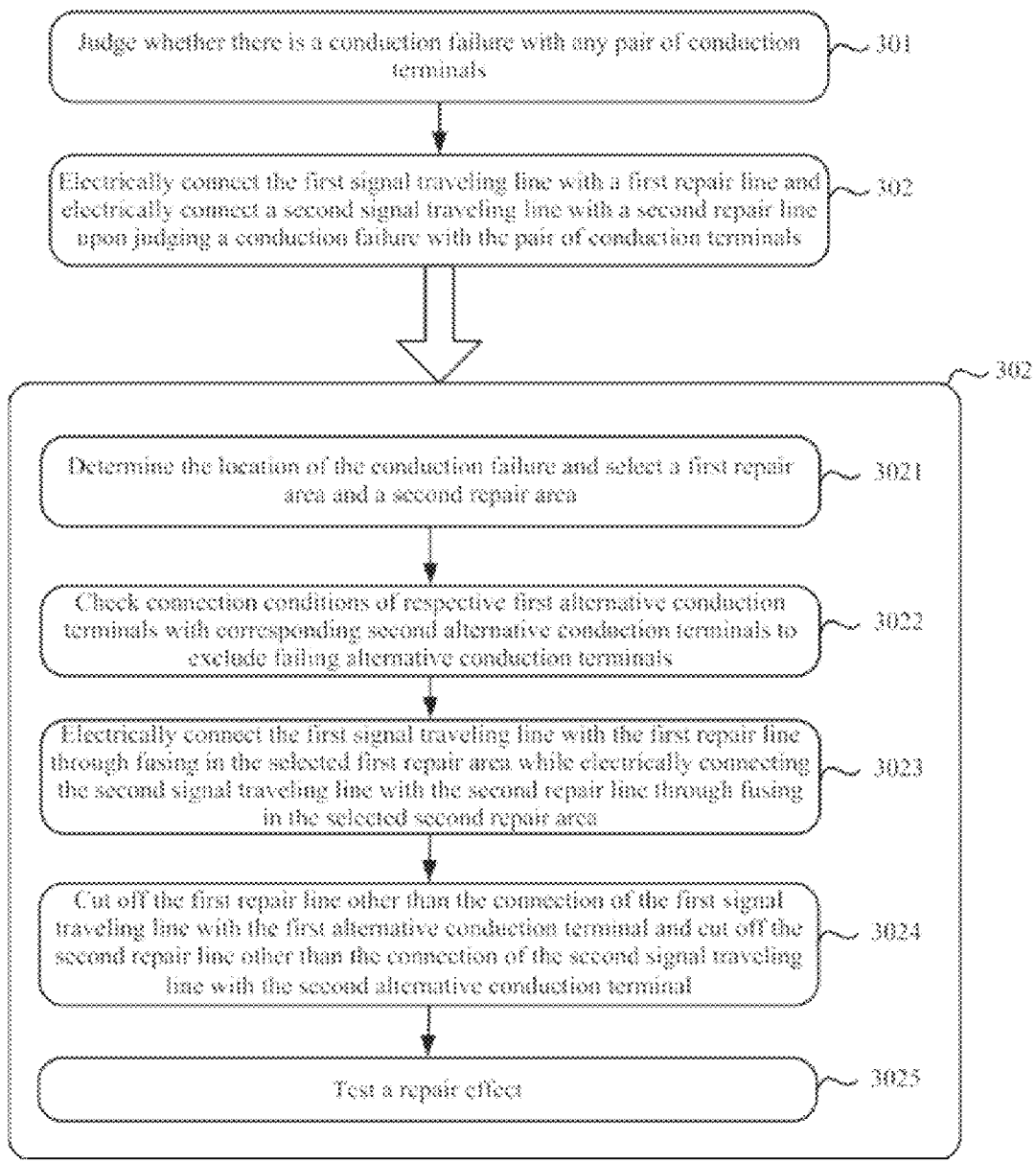
FIG. 8 is a flow chart of a method of repairing a broken line in a display apparatus according to an embodiment of the invention.

An embodiment of the invention will be described below in details with reference to FIG. 8. As illustrated in FIG. 8, there is illustrated a flow chart of a method of repairing a broken line in the display apparatus according to the embodiment, and the method generally includes the following steps 301 and 302.

The step 301 is to judge whether there is a conduction failure with any pair of conduction terminals.

The following several conduction failures may be possible in this step 301: a). a conduction failure between a first conduction terminal and a first signal traveling line; b). a conduction failure between a second conduction terminal and a second signal traveling line; and c). a conduction failure between the first conduction terminal and the second conduction terminal.

The step 302 is to electrically connect the first signal traveling line with a first repair line and electrically connect a second signal traveling line with a second repair line upon judging a conduction failure with the pair of conduction terminals. This step 302 may further include the following sub-steps 3021 to 3025.

The sub-step 3021 is to determine the location of the conduction failure and to select a first repair area and a second repair area.

In addition to this, in this sub-step 3021, line traveling schemes of the signal traveling lines after repairing are designed after the location of the conduction failure is determined and before the first repair area and the second repair area are selected. Moreover the first repair area and the second repair area selected in this step are opposite to each other.

The sub-step 3022 is to check connection conditions of respective first alternative conduction terminals with corresponding second alternative conduction terminals to exclude failing alternative conduction terminals.

It shall be noted that all the alternative conduction terminals exist in pairs, so a pair of alternative conduction terminals will be excluded as long as one of the alternative conduction terminals fails or there is a poor conduction between the first alternative conduction terminal and the second alternative conduction terminal.

The step 3023 is to electrically connect the first signal traveling line with the first repair line through fusing in the selected first repair area while electrically connecting the second signal traveling line with the second repair line through fusing in the selected second repair area.

In a process of connecting through fusing, appropriate fusing schemes can be selected dependent upon the structure of the first repair area and the second repair area arranged for the display apparatus, where fusing schemes are the same as in the sub-step 2023, and a repeated description thereof will be omitted here.

The sub-step 3024 is to cut off the first repair line other than the connection of the first signal traveling line with the first alternative conduction terminal and to cut off the second repair line other than the connection of the second signal traveling line with the second alternative conduction terminal.

The sub-step 3025 is to test a repair effect.

Figure 9:
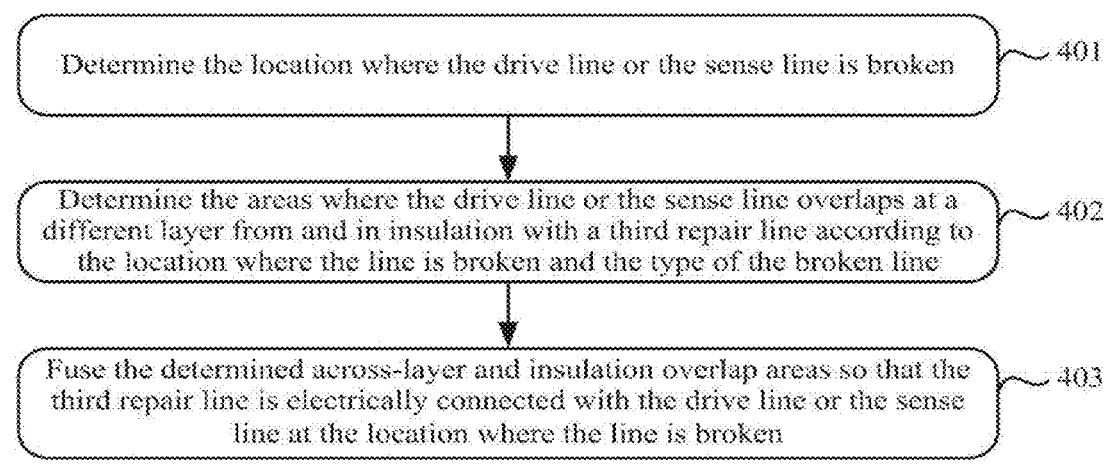
FIG. 9 is a flow chart of a method of repairing a broken line in a display apparatus according to an embodiment of the invention.

An embodiment of the invention will be described below in details with reference to FIG. 9. As illustrated in FIG. 9, there is illustrated a flow chart of a method of repairing a broken line in the display apparatus according to the embodiment, and the method generally includes the following steps 401 to 403.

The step 401 is to determine the location where the drive line or the sense line is broken.

The step 402 is to determine the areas where the drive line or the sense line overlaps at a different layer from and in insulation with a third repair line according to the location where the line is broken and the type of the broken line.

If the location of a drive line is determined in the step 401, then two areas where the drive line overlaps at a different layer from and in insulation with the third repair line needs to be determined; and if the location of a sense line is determined in the step 401, then two areas where the sense line overlaps at a different layer from and in insulation with the third repair line needs to be determined.

The step 403 is to fuse the determined across-layer and insulation overlap areas so that the third repair line is electrically connected with the drive line or the sense line at the location where the line is broken.

The third repair line is grounded for the purpose of shielding while there is no broken line in a viewable area, and when there is a broken line, the two areas where the third repair line overlaps at a different layer from and in insulation with the broken drive line or sense line are fused so that the third repair line is electrically connected across both ends of the drive line or the sense line at the location where the line is broken. Further, the third repair line is disconnected from the ground line so that a signal can be transmitted through the third repair line for the purpose of repairing.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the essence and scope of the invention. Thus the invention is also intended to encompass these modifications and variations thereto so long as the modifications and variations come into the scope of the claims appended to the invention and their equivalents.

What is claimed is:

1. A display apparatus comprising an upper substrate and a lower substrate arranged in opposition, wherein the display apparatus further comprises:
   a plurality of pairs of conduction terminals, wherein a first conduction terminal in each of the pairs of conduction terminals is arranged on an inside surface of the upper substrate, and a second conduction terminal of the pair of conduction terminals is arranged correspondingly on an inside surface of the lower substrate; the first conduction terminal and the second conduction terminal are electrically connected through a conductive adhesive; and the plurality of first conduction terminals are electrically connected respectively with a plurality of first signal traveling lines on the inside of the upper substrate, and the plurality of second conduction terminals are electrically connected respectively with a plurality of second signal traveling lines on the inside of the lower substrate;
   at least one pair of alternative conduction terminals, wherein a first alternative conduction terminal in each of the at least one pair of alternative conduction terminals is arranged on the inside surface of the upper substrate, and a second alternative conduction terminal in the pair of alternative conduction terminal is arranged correspondingly on the inside surface of the lower substrate; and the first alternative conduction terminal and the second alternative conduction terminal are electrically connected through a conductive adhesive; and
   first repair lines, wherein the first repair lines are arranged on the inside surface of the upper substrate, respective first alternative conduction terminals are electrically connected respectively with the first repair lines, and respective second alternative conduction terminals are electrically connected respectively with alternative wires.

2. The display apparatus of claim 1, wherein the first repair lines are arranged at a different layer from and overlap in insulation with the first signal traveling lines connected with the first conduction terminals.

3. The display apparatus of claim 1, wherein the first repair lines each comprise a first repair line first part and a first repair line second part, and the first repair line second part is arranged at a different layer from and overlaps in insulation with a first signal traveling line;
   the first repair line first part is arranged between adjacent first signal traveling lines, the first repair line first part is arranged at a same layer as the first signal traveling lines, and the first repair line first part is electrically connected with the first repair line second part; and
   a first repair section is arranged at an end of the first repair line first part proximate to the first signal traveling line, wherein there is a gap arranged between the first repair section and the first signal traveling line.

4. The display apparatus of claim 1, wherein the first repair lines each comprise a first repair line first part and a first repair line second part, and the first repair line second part is arranged at a different layer from and overlaps in insulation with a first signal traveling line; and
   the first repair line first part is arranged between adjacent first signal traveling lines, and the first repair line first part is electrically connected with the first repair line second part.

5. The display apparatus of claim 1, wherein the alternative wires are arranged on the lower substrate and connected with an external circuit.

6. The display apparatus of claim 1, wherein in a pair of conduction terminals, when there is a conduction failure between a first conduction terminal and a first signal traveling line or a conduction failure between a second conduction terminal and a second signal traveling line or a conduction failure between the first conduction terminal and the second conduction terminal, the first signal traveling line is electrically connected with a first repair line.

7. The display apparatus of claim 1, further comprising second repair lines arranged on the inside of the lower substrate and electrically connected with the alternative wires.

8. The display apparatus of claim 7, wherein the second repair lines are arranged at a different layer from and overlap in insulation with the second signal traveling lines.

9. The display apparatus of claim 7, wherein the second repair lines each comprises a second repair line first part and a second repair line second part, and the second repair line second part is arranged at a different layer from and overlaps in insulation with a second signal traveling line;
   the second repair line first part is arranged between adjacent second signal traveling lines, the second repair line first part is arranged at a same layer as the second signal traveling lines, and the second repair line first part is electrically connected with the second repair line second part; and a second repair section is arranged at an end of the second repair line first part proximate to the second signal traveling line, wherein there is a gap arranged between the second repair section and the second signal traveling line.

10. The display apparatus of claim 7, wherein the second repair lines each comprises a second repair line first part and a second repair line second part, and the second repair line second part is arranged at a different layer from and overlaps in insulation with a second signal traveling line; and the second repair line first part is arranged between adjacent second signal traveling lines, and the second repair line first part is electrically connected with the second repair line second part.

11. The display apparatus of claim 7, wherein in a pair of conduction terminals, when there is a conduction failure between a first conduction terminal and a first signal traveling line or a conduction failure between a second conduction terminal and a second signal traveling line or a conduction failure between the first conduction terminal and the second conduction terminal, the first signal traveling line is electrically connected with a first repair line, and the second signal traveling line is electrically connected with a second repair line.

12. The display apparatus of claim 1, wherein areas where the first alternative conduction terminals contact with the conductive adhesive are larger than areas where the first conduction terminals contact with the conductive adhesive, and areas where the second alternative conduction terminals contact with the conductive adhesive are larger than areas where the second conduction terminals contact with the conductive adhesive.

13. The display apparatus of claim 1, further comprising a touch structure arranged on the inside of the upper substrate; and the touch structure comprises a plurality of transversely arranged drive lines and a plurality of longitudinally arranged sense lines, wherein the drive lines or the sense lines are electrically connected with the first signal traveling lines.

14. The display apparatus of claim 13, further comprising one or more than one third repair line arranged on the inside of the upper substrate; and the third repair line is a looped line and overlaps in insulation with each of the drive lines in two areas and overlaps in insulation with each of the sense lines in two areas.

15. A method of repairing a broken line in a display apparatus, comprising forming an upper substrate disposed with a first plurality of signal travelling lines and a lower substrate arranged in opposition and disposed with a second plurality of signal travelling lines;

forming a plurality of pairs of conduction terminals, wherein a first conduction terminal in each of the pairs of conduction terminals is arranged on an inside surface of the upper substrate, and a second conduction terminal of the pair of conduction terminals is arranged correspondingly on an inside surface of the lower substrate, wherein the first conduction terminal and the second conduction terminal are electrically connected through a conductive adhesive; and the plurality of first conduction terminals are electrically connected respectively with a plurality of first signal traveling lines on the inside of the upper substrate, and the plurality of second conduction terminals are electrically connected respectively with a plurality of second signal traveling lines on the inside of the lower substrate;

forming at least one pair of alternative conduction terminals, wherein a first alternative conduction terminal in each of the at least one pair of alternative conduction terminals is arranged on the inside surface of the upper substrate, and a second alternative conduction terminal in the pair of alternative conduction terminal is arranged correspondingly on the inside surface of the lower substrate; and the first alternative conduction terminal and the second alternative conduction terminal are electrically connected through a conductive adhesive;

forming a first repair line, wherein the first repair line is arranged on the inside surface of the upper substrate, electrically connecting to the first alternative conduction terminal, and wherein the second alternative conduction terminals are electrically connected respectively with alternative wires.

16. The method of claim 15 further comprising:

forming the first repair line includes disposing it at a different layer than, and insulated, from the layer of the first signal traveling lines.

17. The method of claim 15, wherein forming the first repair line further comprises:

disposing a first part between two adjacent first signal traveling lines on the same layer; and disposing a second part at a different layer than, and insulated, from the layer of the first signal traveling lines, wherein the first and second part of the first repair line are electrically connected; and forming a first repair section at an end of the said first part close to the first signal traveling line with a gap from the first signal traveling line.

18. The method of claim 15, wherein forming the first repair line further comprises:

disposing a first part between two adjacent first signal traveling lines on the same layer; and disposing a second part at a different layer than, and insulated, from the layer of the first signal traveling lines, wherein the first and second part of the first repair line are electrically connected.

19. The method of claim 15, further comprises:

forming second repair lines arranged on the inside surface of the lower substrate and forming a plurality of alternative wires.

20. The method of claim 19, further comprises: electrically fusing the second signal traveling line and the second repair line at a location where the second signal traveling line is over the second repair line at a different layer so that the second signal traveling line is electrically connected with the second alternative conduction terminal through a part of the second repair line.

21. The method of claim 19, forming the second repair line further comprising:

disposing a first part between two adjacent second signal traveling lines on the same layer; and disposing a second part at a different layer than, and insulated, from the layer of the second signal traveling lines, wherein the second part is connected with the second conduction terminal, and the second repair line first part comprises a same number of second repair sections as the number of the second conduction terminal, and there is a gap arranged between each of the second repair sections and the second signal traveling line connected with the second conduction terminal.

22. The method of claim 15, further comprising:
disposing a plurality of drive lines and a plurality of sense lines on the upper substrate; and
forming one or more third repair lines forming a loop on the inside surface of the upper substrate, the said third repair lines are disposed on a different layer than, and insulated from each of the plurality of drive lines and each of the plurality of the sense line in two areas in two areas.

23. The method of claim 15 further comprising:
detecting if there is a conduction failure with any pair of conduction terminals; and
electrically connecting the broken line associated with the pair of conduction terminals.

* * * * *